United States Patent [19]

Evans

[11] Patent Number: 4,921,006
[45] Date of Patent: May 1, 1990

[54] VACUUM REGULATOR APPARATUS

[75] Inventor: John R. Evans, Gobowen, England

[73] Assignee: R. J. Fullwood & Bland Limited, Ellesmer, England

[21] Appl. No.: 178,525

[22] Filed: Apr. 7, 1988

[30] Foreign Application Priority Data

Apr. 7, 1987 [GB] United Kingdom ............. 8708244
Jan. 15, 1988 [GB] United Kingdom ............. 8800935

[51] Int. Cl.⁵ ............................................. F16K 37/00
[52] U.S. Cl. ............................... 137/554; 137/492.5; 137/509; 137/557; 137/907
[58] Field of Search ........... 137/554, 488, 492, 492.5, 137/509, 907, 557; 251/61.2, 28

[56] References Cited

U.S. PATENT DOCUMENTS

| | | | |
|---|---|---|---|
| 1,208,392 | 12/1916 | Simmons | 137/554 |
| 2,631,600 | 3/1953 | Flanagan | 137/509 |
| 2,877,791 | 3/1959 | Rich | 137/488 |
| 4,198,030 | 4/1980 | Jackson et al. | 137/554 |
| 4,366,943 | 1/1983 | Licary | 137/907 |
| 4,616,215 | 10/1986 | Maddalena | 137/557 |
| 4,708,316 | 11/1987 | Cook | 137/907 |

FOREIGN PATENT DOCUMENTS

| | | |
|---|---|---|
| 0017493 | 10/1980 | European Pat. Off. . |
| 0173777 | 3/1986 | European Pat. Off. . |
| 575121 | 6/1980 | Japan . |
| 646254 | 11/1984 | Switzerland . |

*Primary Examiner*—A. Michael Chambers
*Attorney, Agent, or Firm*—Merchant, Gould, Smith, Edell, Welter & Schmidt

[57] ABSTRACT

Vacuum regulator apparatus comprising: a valve that in use is arranged to admit air to a vacuum system that in operation is at a sub-atmospheric pressure, the apparatus being so arranged that an increase in the pressure in the vacuum system tends to cause less air to be admitted to the vacuum system by the regulator apparatus, and vice versa; means responsive to the position of the said valve arranged to give a first signal if air is being admitted at more than a first predetermined rate and a second signal if air is being admitted at less than a second predetermined rate lower than the first; and pressure-responsive means arranged to give a third signal if the pressure in the vacuum system is outside a predetermined range.

8 Claims, 2 Drawing Sheets

VACUUM REGULATOR APPARATUS

The invention relates to vacuum regulator apparatus, and vacuum milking apparatus incorporating such vacuum regulator apparatus.

The invention provides vacuum regulator apparatus comprising: a valve that in use is arranged to admit air to a vacuum system that in operation is at a subatmospheric pressure, the apparatus being so arranged that an increase in the pressure in the vacuum system tends to cause less air to be admitted to the vacuum system by the regulator apparatus, and vice versa; means responsive to the position of the said valve arranged to give a first signal if air is being admitted at more than a first predetermined rate and a second signal if air is being admitted at less than a second predetermined rate lower than the first; and pressure-responsive means arranged to give a third signal if the pressure in the vacuum system is outside a predetermined range.

Advantageously, the pressure-responsive means is arranged to give one form of third signal if the pressure in the vacuum system is higher than the upper limit of the said predetermined range and to give a second form of third signal, distinct from the first form, if the pressure in the vacuum system is lower than the lower limit of the said predetermined range.

With the predetermined range of pressures suitably selected, the third signal may serve to indicate that the pressure in the vacuum system is outside a normal working range. The second signal may serve as an indication that the load on the system is approaching the maximum capacity of a pump or other means for drawing the vacuum in the system and, in particular, that there is an inadequate margin to cope with further increases or fluctuations in the load. The first predetermined rate may be selected to be substantially equal to the capacity of the pump, and the first predetermined signal, if it is obtained with the system at its normal operating pressure, may then serve to confirm that there are no significant leaks of air into the vacuum system, and that the pump is working properly.

Advantageously, the vacuum regulator apparatus comprises means arranged to give an alarm signal if either or both of the second and third signals is present and to give a distinctive indication if the first signal is present and the third signal is absent. The said means arranged to give an alarm signal preferably comprises light-emitting or sound-emitting means.

The said means responsive to the position of the said valve may comprise first and second electrical contact means and means movable with a valve member of the said valve and arranged to engage the electrical contact means to close an electrical circuit.

The said valve may be responsive to the pressure in a closed space and the apparatus comprise a pilot valve responsive to the pressure in the vacuum system to admit air to the closed space, and a constricted outlet for air from the closed space to the vacuum system, the apparatus being so arranged that an increase in the pressure in the vacuum system tends to cause the pilot valve to admit more air to the closed space and that the consequent increase in the pressure in the closed space tends to cause the first said valve to admit less air to the vacuum system, and vice versa.

Pressure-responsive portions of the pilot valve and of the said pressure-responsive means are then advantageously substantially identical.

The invention also provides vacuum milking apparatus comprising pump means for extracting air from a vacuum system of the apparatus and vacuum regulator apparatus according to the invention arranged to regulate the level of vacuum in the system.

One form of vacuum milking apparatus incorporating vacuum regulator apparatus constructed in accordance with the invention will now be described by way of example with reference to the accompanying drawings, in which.

Figure 1:
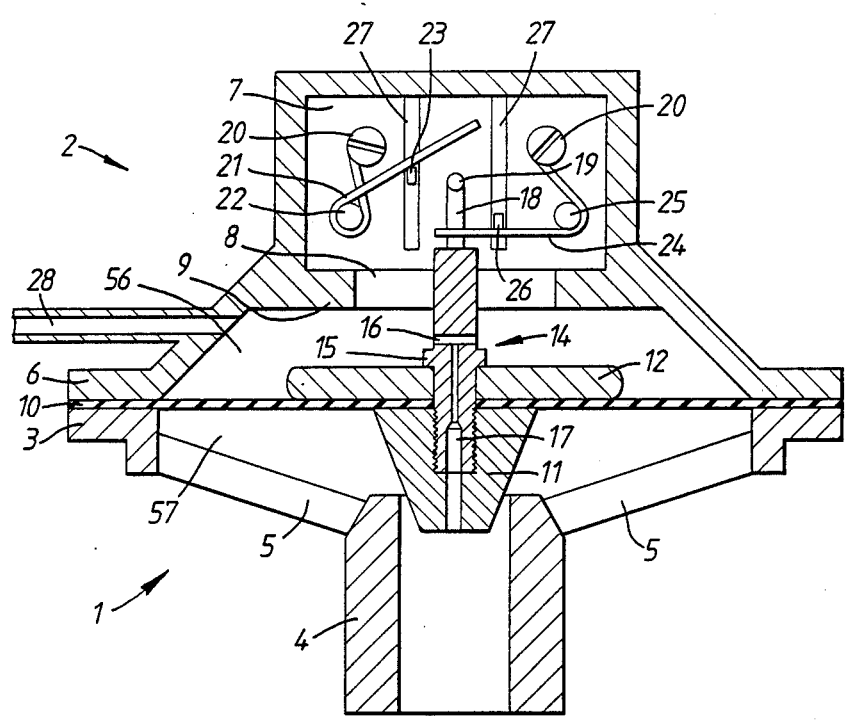
FIG. 1 is an axial cross-section of a main valve assembly of the vacuum regulator.

Referring to FIG. 1 of the accompanying drawings, the main valve assembly comprises a lower body member, which is indicated generally by reference numeral 1 and an upper body member which is indicated generally by reference numeral 2.

The lower body member 1 is flared upwardly (with the main valve assembly orientated as shown in the drawing) and terminates at its upper end in an outwardly extending annular flange 3. At its lower end the lower body member 1 is secured to, or integral with, a length of pipe 4. The flared portion of the lower body member 1 is formed with relatively large apertures 5 which constitute inlet means for atmospheric air.

The upper body member 2 comprises a downwardly flared main portion that terminates at its lower end in an outwardly extending annular flange 6. An upper end portion of the upper body member 2 extends upwardly from the flared portion to form a chamber 7, which is closed at the top, and which has an opening 8 at its lower end opening into the interior of the flared portion and defined by an inwardly extending annular flange 9.

The peripheral portion of a flexible circular diaphragm 10 is clamped between the annular flanges 3 and 6. Thus two further chambers are defined, an upper chamber 56 that lies between the flange 9 and the diaphragm 10, and a lower chamber 57 that lies below the diaphragm 10. Secured to the underside of the diaphragm 10 at its centre is a downwardly tapering frusto-conical valve member 11, a rigid backing plate 12 being provided above the diaphragm. The valve member 11 co-operates with the upper end of the pipe 4 to form the main valve. The pipe 4 connects the lower chamber 57 to the parts of the system that are to be maintained at a reduced pressure during operation.

An elongate member generally indicated by the reference numeral 14 has an outwardly extending annular flange 15 near its mid-point, and is arranged axially with the lower surface of the flange 15 in contact with the centre of the upper surface of the backing plate 12. The lower portion of the elongate member 14 (that is to say the portion below the flange 15) extends downwardly through the backing plate 12 and the diaphragm 10 and part way into the valve member 11. A circular bore is located a short distance above the flange 15 and extends through the elongate member perpendicular to its axis. That bore 16 intersects the top of an axial bore 17, which extends downwardly through the elongate member 14 and the valve member 11, having its lower end at the centre of the lower face of the valve member 14, and air can pass through the bores from one side of the diaphragm 10 to the other.

The upper portion of the elongate member 14 extends part way into the chamber 7 and is surmounted by an electrical contact wire 18 that has a lower portion extending upwardly from the top of the elongate member 14 and an upper end portion 19 bent at right angles to the lower portion. Two further contact wires 21 and 24 are mounted in the chamber 7, one on each side of the contact wire 18, each having one end secured under a screw 20 and a free end portion lying in the path of the upper end portion 19 of the contact wire 18. The contact wire 21 is bent around a pivot pin 22 such that it resiliently resists upward displacement of its free end portion, and is held with its free end portion in an upwardly displaced position above the end portion 19 by means of a pin 23 upon an upper surface of which an intermediate portion of the wire 21 rests. The contact wire 24 is bent around a pivot pin 25 such that it resiliently resists downward displacement of its free end portion and is held with its free end portion in a downwardly displaced position by means of a pin 26 upon a lower surface of which an intermediate portion of the wire 24 rests. Each of the pins 23 and 26 is attached at one end to adjusting means 27, to allow the pins, and hence the contact wires 21 and 24, to be adjusted upwardly or downwardly.

Figure 2:
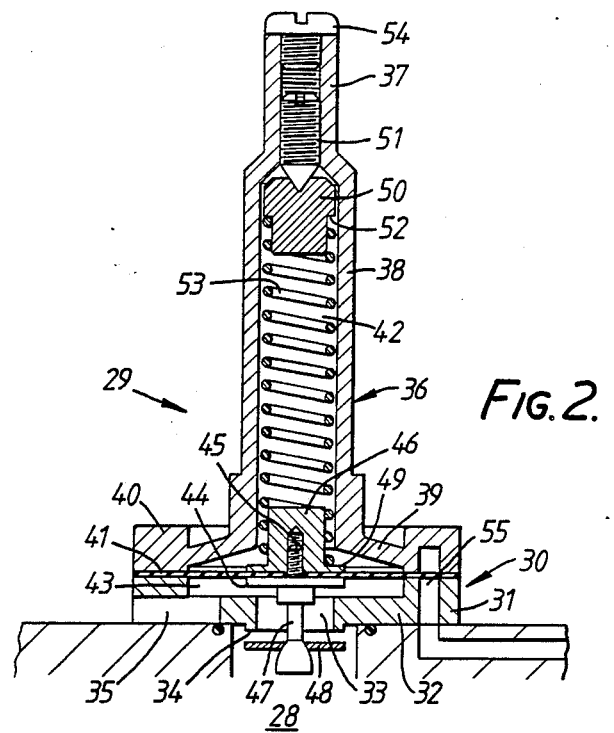
FIG. 2 is an axial cross-section of a pilot valve assembly of the regulator.

A pipe 28, either integral with or connected to the upper body member 2, is connected to a lower body member indicated generally by the reference numeral 30 of a pilot valve assembly indicated generally by the reference numeral 29 and shown in FIG. 2. The lower body member 30 is of cylindrical form having a relatively thick side wall 31 and lower end wall 32 (the upper end being open) the lower end wall having a central aperture 33 aligned with the centre of the pipe 28 and encircled by a downwardly extending annular flange 34, and an aperture 35 that constitutes an inlet means for atmospheric air.

An upper body member generally indicated by the reference numeral 36 comprises an upper cylindrical portion 37 being threaded internally and flared outwardly at its lower end, an elongate cylindrical portion 38 having the same diameter as the lower end of the flared portion of the upper portion, and a lower portion 39 that is flared downwardly from the lower end of the cylindrical portion 38, terminating at its lower end in an outwardly extending annular flange 40.

The peripheral portion of a flexible circular diaphragm 41 is clamped between the annular flange 40 and an upper surface of the side wall 31. Thus two chambers are defined, an upper chamber 42 and a lower chamber 43 separated by the diaphragm 41. A rigid plate 44 is secured to the underside of the diaphragm 41 at its centre by means of a threaded bolt 45 that extends upwardly through the diaphragm and into a threaded bore in the centre of a backing member 46.

The upper end of a shaft 47 is fixed to the lower end of the bolt 45; the shaft 47 extends downwardly through the centre of the aperture 33 and part way into the pipe 28. A circular valve member 48 is fixed near the lower end of the shaft 47 and perpendicular to the shaft such that the valve member lies below the lower surface of the end wall 32. The diameter of the valve member 48 is greater than the diameter of the annular flange 34, which forms a valve seat for the valve member 48, but less than the diameter of the pipe 28.

The backing member 46 extends upwardly from the diaphragm part way into the elongate cylindrical portion 38 and has a diameter less than the inner diameter of the elongate portion except at the lower end where the diameter increases to form an outwardly extending annular flange 49 the diameter of which is approximately equal to that of the rigid plate 44.

A member 50 of similar shape to the member 46 lies at the top of the cylindrical portion 38, bearing against a pointed lower end of a screw 51, which is located in the upper cylindrical portion 37. The diameter of the member 50 increases at the upper end of the member to form an annular flange 52.

A compressed coil spring 53 acts between the flanges 49 and 52; the degree of compression of the spring may be adjusted, after removal of a screw sealing plug 54 on the top of the upper cylinder portion 36, by turning the screw 51; the bearing between the member 50 and the pointed end of the screw 51 allows the screw to turn freely. The members 46 and 50 extend within the end portions of the spring 53 to restrain lateral movement of the spring ends.

A bore 55 passes through the flange 39 and the side wall 31 to connect the upper chamber 42 of the pilot valve assembly to the parts of the system that are to be maintained at a reduced pressure during operation.

In operation, a force due to the pressure in the system and the force of the compressed spring 53 act downwardly (as shown in FIG. 2) on the diaphragm 41 and are balanced by the force due to the pressure of the atmosphere acting upwardly on the diaphragm.

When the system is at reduced pressure air passes through the aperture 33 of the pilot valve and the pipe 28 to the upper chamber 56 of the main valve assembly. The upper chamber 56 is at a pressure below atmospheric pressure because air is drawn from that chamber through the bores 16 and 17 and into the pipe 4 by the vacuum pump of the system, and therefore the main valve is open, the member 11 lying above the upper end of the pipe 4. In the equilibrium state the rate of flow of air entering the system through the apertures 5 and 34 is equal to the rate at which air is pumped out of the system by the vacuum pump.

If the reduced pressure of the system falls, for example, because the amount of air that the pump is receiving from various loads on the system is reduced, the pressure above the diaphragm 41 similarly falls causing a net upward force on the diaphragm which is displaced upwardly until the increased compression of the spring 53 again balances the effect of the difference in the air pressures acting on the diaphragm. The upward displacement of the diaphragm 41 decreases the gap between the valve member 48 and the flange 34, reducing the flow of air from the lower chamber 43 of the pilot valve assembly to the upper chamber 56 of the main valve assembly.

The rate at which air escapes from the chamber 56 is then greater than the rate at which air enters the chamber and thus the pressure in the chamber falls causing the diaphragm 10 and the valve member 11 to rise, and the gap between the valve member and the upper end of the pipe 4 to increase. Therefore the rate of flow of air entering the system through the apertures 5 is increased and the pressure in the vacuum system rises.

Similarly, if the pressure in the vacuum system rises, the diaphragm 41 is pushed down, increasing the air flow to the upper chamber 56; the pressure in that chamber then increases pushing the valve member 56 towards the upper end of the pipe 4, thereby reducing the rate of flow of air to the vacuum system and lowering the pressure in the system.

For a given, desired air pressure in the system, if the air flow through the main valve necessary to prevent the pressure in the vacuum system from falling too low rises above a first predetermined rate, then the main valve member 11 is displaced upwardly so far that the contact wire 18 touches the contact wire 21, completing a first electric circuit. If the air flow through the main valve is reduced below a second predetermined rate, lower than the first, the main valve member 11 is displaced downwardly so far that the contact wire 18 touches the contact wire 24, completing a second electric circuit. Any signals obtained from those first and second circuits may be integrated with respect to time in a conventional way to remove signals caused by transient changes in the system. Any output signal from the second electric circuit causes conventional alarm means, for example, an electric bell or a light (which may be a flashing light), to be switched on, so that an operator may be made aware of the condition of the system.

Before use, the degree of compression of the spring must be set (by turning the screw 51 as described above) so that the range of system pressures at which the main and pilot valve assemblies are in equilibrium (depending on the load on the system) is suitable for the system in question.

The positions of the main valve member 11 at which the first and second electric circuits are completed may be set by adjusting the means 27 that set the positions of the free end portions of the wires 21 and 24.

The upper contact wire 21 may be so positioned that the first electrical circuit gives a signal when the rate at which air enters the vacuum system through the main valve is substantially equal to the full capacity of the pump. That is done by adjusting the wire 21 just to make contact with the wire 18 when the pump is switched on and substantially no air is entering the system through leaks or as a result of the operation of any equipment that places a load on the system vacuum. The system may then subsequently be tested for leaks by deliberately operating it at normal pressure with no load; if the first electric circuit is completed then substantially no air is entering via a leak, and the apparatus may be arranged to give a distinctive signal in that case.

Usually the capacity of the pump of vacuum milking apparatus must exceed the maximum requirements of the apparatus by at least a certain amount and therefore the capacity of the pump must be met in part by at least a certain minimum amount of air entering the system through the main valve 11, and the lower contact wire 24 may be so positioned that the second electric circuit is completed when the rate at which air enters the system through the main valve falls to that value.

Figure 3:
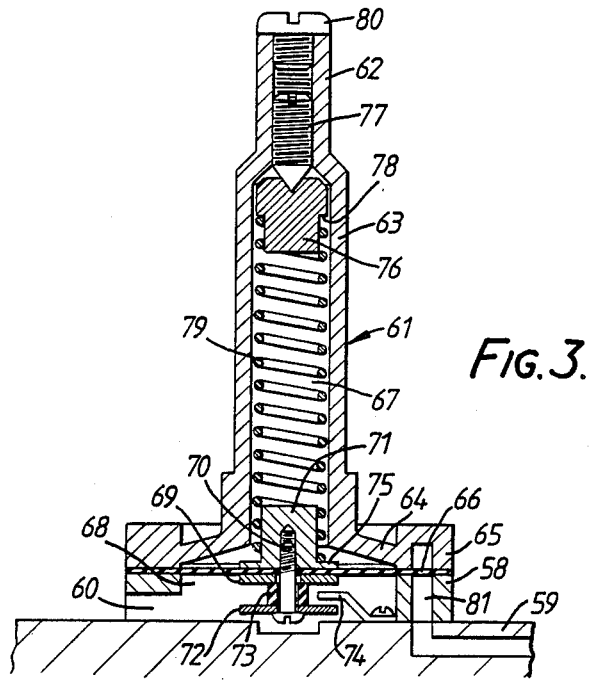
FIG. 3 is an axial cross-section through a pressure indicator assembly.

Referring to FIG. 3, a pressure indicating assembly may be added to the system.

A lower body member 58 of cylindrical shape is attached to an upper wall 59 of the system housing, the member having an aperture 60 which constitutes an inlet for atmospheric air.

An upper body member generally indicated by the reference numeral 61 comprises an upper cylindrical portion 62 being internally threaded and flared outwardly at its lower end, an elongate cylindrical portion 63, and a lower portion 64 that is flared downwardly terminating at its lower end in an outwardly extending annular flange 65.

The peripheral portion of a flexible circular diaphragm 66 is clamped between the annular flange 65 and the upper surface of the lower body member 58. Two chambers are defined, the upper chamber 67 and the lower chamber 68 being separated by the diaphragm 66.

A first circular rigid plate 69, being an electrical contact plate, is secured to the underside of the diaphragm 66 at its centre by means of a threaded bolt 70 that extends upwardly through the diaphragm and into a threaded bore in the centre of a backing member 71. A second circular rigid electrical contact plate 73, which has a diameter approximately equal to that of the first contact plate 69, is secured to the lower end of the bore 70 so that it is perpendicular to the bolt and parallel to the first rigid plate 69. A cylindrical electrically insulating bush 73, the height of which determines the separation of the plates 69 and 72, and which has an external diameter less than that of the plates and an internal diameter approximately equal to that of the shaft of the bolt 70, is located between the plates, the bolt passing through its centre.

A fixed electrical contact in the form of a metal bar 74 is fixed at one end to the upper wall 59 of the housing, the bar being shaped so that the other end lies between the plates 69 and 72.

The backing member 71 extends upwardly from the diaphragm 66 into the elongate cylindrical portion 63 and has a diameter less than the inner diameter of the of the elongate portion except at the lower end where the diameter increases to form an outwardly extending annular flange 75, the increased diameter being approximately equal to that of the rigid plates 69 and 72.

A member 76 of similar shape to the backing member 71 lies at the top of the elongate cylindrical portion 63, bearing at its upper end against a pointed lower end of a screw 77 which is located in the upper cylindrical portion 62. The diameter of the member 76 increases at the upper end of the member to form an annular flange 78.

A spring 79 acts in compression between the flanges 75 and 78; the degree of compression of the spring may be adjusted, after removal of the screw sealing plug 80, by turning the screw 77. The members 71 and 76 extend into the ends of the spring 79 to restrain lateral movement of the spring end portions.

A bore 81 passes through the flange 65 and downwardly through the wall of the lower body member 58 to connect the upper chamber 67 to the parts of the system that are to be maintained at a reduced pressure during operation.

It will be seen that many components of the pressure-indicating assembly are identical to components of the pilot valve assembly shown in FIG. 2, so that those two assemblies are made largely from the identical components.

When the system is at the desired reduced pressure the unattached end of the fixed electrical contact 74 lies between the two plates 69 and 72. When the pressure in the system drops below the lower limit of a predetermined range of pressures the diaphragm 66 rises to the point at which the lower contact plate 73 touches the contact 74 completing a third electrical circuit. Similarly if the reduced pressure rises above the upper limit of the range the upper plate 69 touches the contact 74 completing the third electrical circuit or, where one is provided, a fourth electrical circuit. The resulting third signal (which may be either of two distinct signals, depending on which electrical circuit is completed, in the case where a fourth circuit is provided) may be integrated with respect to time to eliminate signals caused by transient conditions, and any such third signal may then cause a conventional alarm means, or one or other of two such alarm means, for example, a bell or lights, to be switched on to alert an operator to the condition of the system. Thus the reference pressure indicator may be set to alert an operator to unacceptable variations in the reduced pressure of the system.

In addition, the arrangement is preferably such that completion of the third electrical circuit, or of the fourth electrical circuit if there is one, suppresses any indication that would otherwise be given by the first electrical circuit to signify that the system is free from leaks and otherwise operating properly. That is desirable, because the position of the valve member 11, the position of which determines whether the first electrical circuit is completed, depends both upon the rate of air flow through the main valve and on the difference between the pressure in the system and atmospheric pressure, so that for the position of the valve member 11 to give the desired measure of the rate of air flow through the main valve, the difference between the pressure in the system and atmospheric pressure must be within the limits defined by completion of the third electrical circuit or, where a fourth electrical circuit is also provided, by completion of the third and fourth electrical circuits, respectively.

I claim:

1. Vacuum pressure control apparatus for a vacuum system that in operation is at a sub-atmospheric pressure, said apparatus comprising: means defining an inlet for ambient air into said vacuum system; a valve that in use is arranged to control the degree of opening of said inlet; first pressure-responsive means responsive to the pressure in said vacuum system and operative to decrease the degree of opening of said valve in response to a rise in said pressure and to increase said degree of opening in response to a fall in said pressure; signaling means responsive to said degree of opening of said valve and operative to give a first signal if said valve is open to admit air to said vacuum system at more than a first predetermined rate and to give a second signal if the degree of opening of said valve is reduced to admit air to said vacuum system at less than a second predetermined rate; and second pressure-responsive means operative to give a third signal ifs aid pressure is outside a predetermined range.

2. Apparatus as claimed in claim 1, wherein said second pressure-responsive means is operative to give a first form of third signal if the pressure in the vacuum system is higher than the upper limit of the said predetermined range and to give a second form of third signal, distinct from the first form, if the pressure in the vacuum system is lower than the lower limit of the said predetermined range.

3. Apparatus as claimed in claim 1, comprising signalling means responsive to said first, second, and third signals to give an alarm signal if either or both of the second and third signals is present and to give a distinctive indication if the first signal is present and the third signal is absent.

4. Apparatus as claimed in claim 3, wherein the said signalling means comprises light-emitting and/or sound-emitting means.

5. Apparatus as claimed in claim 1, wherein the said means responsive to the degree of opening of the said valve comprises first and second electrical contact means and means movable with a valve member of the said valve and arranged to engage the electrical contact means.

6. Apparatus as claimed in claim 1, which comprises means defining a closed space, means responsive to an increase in the pressure in said closed space to reduce the degree of opening of said valve, and vice versa, a pilot valve responsive to an increase in the pressure in the vacuum system to admit more air to the closed space, and vice versa, and a constricted outlet for air from the closed space to the vacuum system.

7. Apparatus as claimed in claim 6, wherein pressure-responsive portions of the pilot valve and of the said second pressure-responsive means are substantially identical.

8. Vacuum milking apparatus that comprises a vacuum system that in operation is at a sub-atmospheric pressure control apparatus comprising: means defining an inlet for ambient air into said vacuum system; a valve that in use is arranged to control the degree of opening of said inlet; fluid pressure-responsive means responsive to the pressure in said vacuum system and operative to decrease the degree of opening of said valve in response to a rise in said pressure and to increase said degree of opening in response to said degree of opening of said valve and operative to give a first signal if said valve is open to admit air to said vacuum system at more than a first predetermined rate and to give a second signal if the degree of opening of said valve is reduced to admit air to said vacuum system at less than a second predetermined rate; and second pressure-responsive means operative to give a third signal if said pressure is outside a predetermined range.

* * * * *